(12) United States Patent
Binkley

(10) Patent No.: US 8,563,632 B2
(45) Date of Patent: Oct. 22, 2013

(54) HIGHLY-FILLED SEALANT COMPOSITIONS

(75) Inventor: Jesse Alvin Binkley, Midlothian, TX (US)

(73) Assignee: Carlisle Intangible Company, Syracuse, NY (US)

(*) Notice: Subject to any disclaimer, the term of this patent is extended or adjusted under 35 U.S.C. 154(b) by 135 days.

(21) Appl. No.: 13/167,543

(22) Filed: Jun. 23, 2011

(65) Prior Publication Data

US 2011/0313088 A1  Dec. 22, 2011

Related U.S. Application Data

(62) Division of application No. 12/359,423, filed on Jan. 26, 2009, now Pat. No. 7,994,244.

(51) Int. Cl.
  *C08L 95/00*  (2006.01)
  *C08L 23/00*  (2006.01)

(52) U.S. Cl.
  USPC ............................................ 524/59; 524/274

(58) Field of Classification Search
  USPC .......................................................... 524/59
  See application file for complete search history.

(56) References Cited

U.S. PATENT DOCUMENTS

| | | | |
|---|---|---|---|
| 2,078,727 A | 4/1937 | Jackson | |
| 2,418,135 A | 4/1947 | Moore et al. | |
| 3,053,781 A | 9/1962 | Steltz et al. | |
| 3,644,240 A | 2/1972 | Tarbell et al. | |
| 4,235,953 A | 11/1980 | Kumins et al. | |
| 4,256,491 A | 3/1981 | Tate | |
| 4,272,419 A | 6/1981 | Force | |
| 4,413,026 A | 11/1983 | Sherno | |
| 4,433,084 A | 2/1984 | Ostermeyer et al. | |
| 4,437,896 A * | 3/1984 | Partanen | 106/223 |
| 4,479,827 A | 10/1984 | Ward | |
| 4,480,053 A | 10/1984 | Sherno | |
| 4,775,567 A * | 10/1988 | Harkness | 428/40.3 |
| 4,822,425 A | 4/1989 | Burch | |
| 4,824,880 A | 4/1989 | Algrim et al. | |
| 4,923,913 A | 5/1990 | Chich et al. | |
| 5,021,476 A | 6/1991 | Pinomaa | |
| 5,221,703 A | 6/1993 | Ostermeyer | |
| 5,308,898 A | 5/1994 | Dawans | |
| 5,329,605 A | 7/1994 | Wargotz | |
| 5,443,632 A | 8/1995 | Schilling | |
| 5,455,291 A * | 10/1995 | Bruns | 524/66 |
| 5,473,000 A | 12/1995 | Pinomaa | |
| 5,622,554 A | 4/1997 | Krogh et al. | |
| 5,929,144 A | 7/1999 | Fields | |
| 5,973,037 A | 10/1999 | Fields | |
| 5,979,133 A | 11/1999 | Funkhouser | |
| 6,346,561 B1 | 2/2002 | Osborn | |
| 6,770,127 B2 | 8/2004 | Kriech et al. | |
| 6,833,188 B2 | 12/2004 | Semmens | |
| 7,234,284 B2 | 6/2007 | Paradise et al. | |
| 2002/0111401 A1 | 8/2002 | Izumoto | |
| 2005/0051056 A1 | 3/2005 | Bailey et al. | |
| 2007/0049664 A1* | 3/2007 | Partanen | 524/60 |
| 2007/0077838 A1 | 4/2007 | Binkley et al. | |
| 2008/0038470 A1* | 2/2008 | Hagens et al. | 427/340 |
| 2009/0084287 A1* | 4/2009 | Partanen et al. | 106/273.1 |

OTHER PUBLICATIONS

Arizona Chemical, Product Data Sheet, SYLFAT® DP-8, Mar. 22, 2006, Savannah, GA, 1 p.
Georgia-Pacific, Tall Oil Fatty Acids and Derivatives, 2 pp.
Georgia-Pacific, Tall Oil Rosin and Derivatives, 2 pp.

\* cited by examiner

*Primary Examiner* — Hui Chin
(74) *Attorney, Agent, or Firm* — Wood, Herron & Evans, LLP

(57) ABSTRACT

A sealant composition comprising a binder and a filler material. The binder comprising a residual pitch product and an elastomeric material and, optionally, asphalt, a microcrystalline wax, and/or oil. The filler material is present in an amount of between about 11 vol. % and about 67 vol. % of the sealant composition. In one embodiment, the filler material is present in an amount of between about 25 wt. % and about 70 wt. % of the sealant composition.

11 Claims, No Drawings

HIGHLY-FILLED SEALANT COMPOSITIONS

CROSS REFERENCE TO RELATED APPLICATION

This application claims the benefit of and is a divisional application of U.S. patent application Ser. No. 12/359,423, filed on Jan. 26, 2009, which is pending.

FIELD OF THE INVENTION

The present invention relates to waterproofing and sealant compositions, and, more particularly, relates to waterproofing and sealant compositions that contain a high volume percent of a filler material.

BACKGROUND OF THE INVENTION

The exterior surfaces of buildings are usually sealed against water penetration. Often, a waterproofing composition is applied to these surfaces to prevent water ingress. The composition may be applied with a trowel or laid by placing preformed sheets of the composition onto a surface. These waterproofing materials may be used on virtually any structural surface, including both vertical and horizontal surfaces. For example, one common application is in waterproofing roofs.

Besides enduring the onslaught of wind, rain, and sun, these coatings must resist degradation due to the day-to-night temperature cycles and the more severe winter-to-summer temperature cycles. In particular, exposed waterproofing materials must remain flexible when the temperature changes as any cracking of the coating may permit the subsequent ingress of water. Of course, water leakage often leads to damage to the structure of the building and possibly to the building's contents.

As is known in the art, some waterproofing compositions contain mixtures of asphalt, rubber, and filler material. In these compositions, the rubber is usually added to enhance elasticity of the asphalt/rubber mixture. The asphalt is used generally to bind particles of the filler material together and to provide weather resistance to the coating. The filler material is added generally to reduce the cost of the sealant composition but may be added to enhance certain properties of the coating formed of the sealant composition. However, the amount of the filler material that can be added to compositions containing only asphalt/rubber is limited. For example, presently available asphalt/rubber compositions may contain about 16 wt. % of a filler material such as calcium carbonate.

The cost of waterproofing compositions has risen sharply in the last few years due, in part, to an increase in the cost of petroleum—the source of most commercial asphalt. While the cost of waterproofing compositions has increased, builders, to maintain their competitiveness, have demanded lower cost building products in an effort to keep their material costs within affordable levels. Accordingly, waterproofing or sealant manufacturers are under pressure to provide cost effective waterproofing materials while fulfilling the builders' demand for products that are easy to use, that do not crack at low temperatures, and that are affordable. Although adding additional filler material to existing asphalt/rubber only compositions may reduce their cost, adding more filler material to these compositions creates other problems. For example, the composition becomes more difficult to manufacture, and, similarly, adding filler material to these compositions renders them difficult or impossible to effectively apply.

A need therefore exists for affordable waterproofing and sealant compositions that are capable of being highly filled yet have equivalent or improved lower temperature flexibility.

SUMMARY OF THE INVENTION

The present invention is directed to sealant compositions that have high filler loadings. The sealant compositions may be used to waterproof surfaces that are exposed to the Earth's natural environment, including for instance, the sun, rain, wind, and hot and cold temperatures. To that end, embodiments of the sealant composition exhibit significant resistance to degradation due to exposure to these elements. Advantageously, embodiments of the present invention contain relatively large volumes of filler material while unexpectedly maintaining low temperature flexibility. Specifically, they exhibit resistance to extreme cold, i.e., they resist cracking to a greater degree than asphalt/rubber only compositions when subjected to these temperatures.

Moreover, compared to rubber/asphalt only compositions, embodiments of the present invention exhibit substantially lower viscosity during manufacturing and application at comparable filler material loadings and elastomeric material weight percentages. For example, unlike embodiments of the present invention, rubber/asphalt only compositions containing 50% weight percent calcium carbonate are not capable of being effectively stirred and do not readily flow at temperatures between 330° F. up to 400° F. Therefore, unlike rubber/asphalt compositions with high volumes of filler material, embodiments of the sealant composition can be cost effectively manufactured and can be applied with currently available industrial techniques.

In one embodiment, the sealant composition comprises a binder and a filler material. The binder comprises an elastomeric material and a residual pitch product, and, optionally, asphalt, a microcrystalline wax, and/or an oil, where, as will be described more fully below, the filler material occupies between about 11 vol. % and about 67 vol. % of the sealant composition. The elastomeric material and the residual pitch product act as a binder to suspend and bind the particles of the filler material. In addition, the elastomeric material, the residual pitch product, and any other additives, such as the optional microcrystalline wax and/or oil, form a substantially continuous phase which coats and surrounds the filler material rather than merely bonding individual particles together. The sealant composition, when properly applied, forms a nearly impenetrable barrier to water. Furthermore, while the microcrystalline wax and/or oil may be added to the sealant composition, the sealant composition does not require either of these components to achieve these high loadings while exhibiting excellent flexibility at low temperatures. This advantageously reduces the material costs, improves process control due to fewer variables, and generally provides for a more consistent cost effective product.

DETAILED DESCRIPTION OF THE INVENTION

The sealant composition includes a binder plus a filler material. Further, the binder comprises an elastomeric material and a residual pitch product and, optionally, asphalt, a microcrystalline wax, and/or oil. The viscosities of the sealant composition of the present invention are unexpectedly lower than asphalt/rubber only compositions of comparable filler and rubber levels. Consequently, additions of residual pitch product allow greater quantities of the filler material to be added to the sealant composition without adversely affecting the viscosity of the sealant composition.

In general, applications for embodiments of the sealant composition of the present invention include those directed to water and ice protection or to water vapor barriers for building envelopes. By way of example, embodiments of the invention described herein may be applied to roofs, plaza decks, roof terraces and planters, parking garages, foundation walls, walkway links, highway bridge decking and tunnels, or green-roof/rooftop planting systems, or other surfaces which should be sealed to prevent water ingress. The surface itself may be made of, for example, concrete, including lightweight structural concrete, or metal, among others. It will be appreciated, however, that there are other suitable applications.

The elastomeric material may be any material that provides sufficient elastomeric-type, or non-linear elasticity to the sealant composition. In particular, and in one embodiment, the elastomeric material is rubber. Suitable commercially available elastomeric materials include, SOLPRENE® 411 high molecular weight radial styrene-butadiene block copolymer, SOLPRENE® 4318 linear block copolymer, and SOLPRENE® 1205 linear random-block styrene-butadiene copolymer, each available from Dynasol of Houston, Tex. By way of example, elastomeric materials containing 25% to 30% styrene which likely form a polystyrene block are suitable for inclusion in the binder. Other suitable polymeric materials may include styrene-butadiene-styrene (SBS), styrene-butadiene, styrene-ethylene/butylene-styrene (SEBS), styrene-isoprene-styrene (SIS), ethylene propylene diene M-class (EPDM) rubber, and polyamides. These polymeric materials are commercially available from Kraton of Houston, Tex.; LCY Elastomers LP of Baytown, Tex.; and Arizona Chemical of Jacksonville, Fla. It will be appreciated, however, that the elastomeric material may be selected from other suitable elastomeric materials that are compatible with the residual pitch product and provide the requisite elastomeric properties to the sealant composition.

The amount of the elastomeric material in the binder may depend upon many factors, such as the composition of the elastomeric material itself and the quantity and type of the filler material, the residual pitch product, and microcrystalline wax and oil, if any, each of which is described below. For example, if the elastomeric material is a linear polymer, more of the elastomeric material may be added to the sealant composition than if the elastomeric material is a radial triblock polymer. In addition, the amount of the elastomeric material added may depend on the cost of the elastomeric material and the intended application. The amount of the elastomeric material may, moreover, depend upon the mixing equipment available because, generally, as the amount of the elastomeric material increases, the viscosity of the sealant composition also increases. As the viscosity of the sealant composition increases, mixing equipment having more power to effectively prepare the sealant composition may be required. Accordingly, taking into account these factors, and not intending to be bound by theory, the amount of elastomeric material added may be sufficient to provide a continuous network of the elastomeric material molecules or may be sufficient to position the molecules of the elastomeric material sufficiently close to one another within the sealant composition. In other words, the amount of the elastomeric material added, while depending upon the factors set forth above, provides a measurable improvement in the flexibility of the sealant composition. By way of example, the binder may contain at least about 4 wt. % of the elastomeric material up to about 60 wt. % of the elastomeric material. In a further example, the binder may contain about 6 wt. % up to about 20 wt. % of the elastomeric material. By way of additional example, the binder may contain between about 6 wt. % and about 15 wt. % of the elastomeric material to balance the cost and the flexibility of the sealant composition.

As provided above, the binder also contains a residual pitch product. The residual pitch product may be derived from plants, such as trees. Residual pitch products are by-products of processing plant material generally including a blend of fatty acids, esterified fatty acids, resin acids, and unsaponifiables. For instance, in one embodiment, the residual pitch product is a distillate of a by-product of a wood pulping process for making paper, which may contain various resin and fatty acids. Specifically, the residual pitch product may appear as a dark soft solid and may contain about 25 wt. % fatty acids and esterified acids, about 25 wt. % rosin acids, and unsaponifiables of about 7 wt. %. However, the residual pitch product may have other fractions with some being longer polymeric molecules and others being shorter molecules. The residual pitch product may be characterized by a lower temperature softening point and a glass transition temperature that is less than asphalt. In one embodiment, the residual pitch product is pine pitch residue produced by heating resin obtained from conifers, which may contain resin acids. The residual pitch product may also be a tall oil rosin derivative, sometimes referred to as tall oil pitch or bottoms, or products from tall oil fractionation. Products from tall oil fractionation generally contain at least about 91 wt. % fatty acids, a maximum of about 3.0 wt. % rosin acids, and unsaponifiables of up to about 3 wt. %. Other products from tall oil fractionation may contain at least about 90 wt. % rosin acids, fatty acids of up to about 4 wt. %, and unsaponifiables of up to 6 wt. %. Residual pitch products are commercially available from, for example, Arizona Chemical, Jacksonville, Fla., such as SYL-FAT® DP-8 residual pitch product. Tall oil derivatives are also commercially available, such as TALLEX® tall oil derivative from Meadwestvaco Corporation, Stamford, Conn.; and XTOL® and LYTOR® tall oil derivatives sold by Georgia-Pacific Chemicals LLC, Atlanta, Ga.

Like the elastomeric material, the amount of the residual pitch product added may depend on a variety of factors including, for example, the type and quantity of the elastomeric material and the type and quantity of the filler material. Further, as the amount of the residual pitch product in the sealant composition decreases, the amount of the filler material that may be added to the sealant composition also decreases. In one embodiment, the residual pitch product is at least about 34 wt. % of the binder up to about 96 wt. % of the binder. In another embodiment the residual pitch product is at least about 60 wt. % of the binder.

The filler material is a solid inert material in particulate form. The average particle size of the filler material may vary and may depend upon the composition of the filler material, its cost for different average particle sizes of the filler material, and the application for which the sealant composition is made. Generally, as the average particle size is reduced, the viscosity of the sealant composition increases. The inverse is also true, that is, as the average particle size is increased the viscosity is reduced. In one embodiment of the invention, the average particle size is less than about 50 µm and is more often less than about 25 µm. The average particle size is usually greater than about 0.5 µm, and in another example it may be greater than about 0.8 µm, to reduce dusting during manufacturing. The filler material may comprise a reactive material or one that is an inert inorganic material, such as ceramic microspheres, glass beads (either hollow or solid), calcium carbonate, mica, talc, or gypsum or a combination thereof. Other suitable materials include granite, volcanic ash, barium sulfate, and ground-up rubber and/or plastic. By way of example, calcium carbonate powder is available from Huber Engineered Materials, Atlanta, Ga., under the trademark HUBERCARB® G Series calcium carbonate. For example, HUBERCARB® G 325 calcium carbonate powder may be characterized by a mean particle size of 10.5 μm, a weight per gallon of 22.6 lbs/solid gallon, and a particle size screen analysis of 100% passing through a 100 mesh screen, 99.9% passing through a 200 mesh screen, and 99% passing through a 325 mesh screen.

As is described above, the amount of the filler material may depend upon the amount of the residual pitch product in the sealant composition. In one embodiment, the upper limit to the amount of filler material should not exceed an amount that negatively impacts application of the sealant composition to a surface, that inhibits the sealant composition's capability of adhering to the surface, or that degrades the low temperature flexibility of the sealant composition during use. In one embodiment of the invention, the volume of the filler material in the sealant composition is up to about ⅔ or about 67 vol. % of the sealant composition. In one example, the filler material is present in an amount of at least about 14.0 vol. % of the sealant composition. In another example the filler material is present in an amount of at least about 16.5 vol. %.

It will be appreciated that while the volume of the filler material in the sealant composition is described, the filler material is often specified in terms of weight percent of the sealant composition. Thus, depending on the density of the filler material, the weight of the filler material in the sealant composition may vary from relatively low weight percents for low-density filler materials to relatively high weight percentages for high-density filler materials. By way of example, the filler material may be ceramic microspheres that have relatively low density such that the limit of the ceramic microspheres in the sealant composition is between about 5 wt. % and about 10 wt. %, which may be around 70 vol. % of the sealant composition. In another example, the filler material is calcium carbonate or $CaCO_3$ (often added in the form of limestone) that is added to the binder in an amount of about 25 wt. % to about 70 wt. % of the sealant composition. In yet another embodiment, the filler material is between about 45 wt. % and about 70 wt. % of the sealant composition.

The binder may further include asphalt. Generally, any suitable asphalt may be added to the binder. As is known in the art, asphalt may be obtained from naturally occurring sources or is one of the cuts during distillation of petroleum. As such, the composition of asphalt may vary by refining source and by petroleum source. Furthermore, the asphalt may be oxidized as is known in the art. Asphalt generally contains various fractions of hydrocarbons, such as polycyclic hydrocarbons, and may also contain some polar elements. Asphalt is a black material having a softening point of between about 85° F. and about 200° F., but the softening point may be higher depending on the petroleum source and the various hydrocarbon fractions. The penetration of the asphalt may be between about 5 and about 300 decimillimeters at 77° F. with a 100 g load applied for 5 seconds, but is preferably about 180 decimillimeters. Asphalt is also graded by its rheological properties, for example, by its viscosity. According to one embodiment of the invention, the asphalt has a viscosity between about 200 and 3000 poises at 140° F. In other embodiments, the asphalt may be designated: AC-3, AC-5, AC-7.5, AC-10, AC-20, and AC 30. In a further example, the asphalt may be one or more of AC-3, AC-5, AC-7.5 and AC-10 because the softening points and penetrations of these asphalts make them more applicable to the applications set forth above. It will be appreciated, however, that higher viscosity asphalts may be utilized in applications that require a high viscosity binder.

According to embodiments of the present invention, asphalt is available from Owens Corning, Toledo, Ohio; Valero, San Antonio, Tex.; Marathon, Houston, Tex.; and ConocoPhillips, Houston, Tex.

When present, the amount of the asphalt in the binder may depend on a number of considerations, including, for instance, the application for which the sealant composition is manufactured and availability or cost considerations incident to the manufacturing process. As such, the amount of the asphalt in the binder may amount to the balance of the binder, taking into account the amounts of the elastomeric material and the residual pitch product, described above, and the microcrystalline wax and oil, described below. In one exemplary embodiment, the amount of the asphalt is less than about 60 wt. % of the binder. This binder composition may support large volumes of the filler material, e.g., calcium carbonate, while maintaining a low temperature flexibility that is superior to the asphalt/rubber only compositions. In another exemplary embodiment, a ratio of residual pitch product to asphalt is at least about 75/25 and the sealant composition contains the filler material in an amount of as high as about 70 wt. % of calcium carbonate.

The binder optionally contains a microcrystalline wax. The microcrystalline wax may be produced from coal gasification using the Fischer-Tropsch (FT) process and, accordingly, may be referred to as an FT hard wax. Generally, the microcrystalline wax is a long-chain aliphatic polymethylene hydrocarbon with a carbon chain length range of between about $C_{45}$ to about $C_{100}$ or more and may melt at around 100° C. By way of example, microcrystalline waxes are sold by Sasol Wax North America Corp., Shelton, Conn., under the trademark SASOBIT®, for example, SASOBIT® H8 microcrystalline wax. Other commercial sources include The International Group, Inc. Toronto, Ontario. The amount of the microcrystalline wax in the binder may vary by selection of the manufacturer of the wax, by the amount of the residual pitch product, or by the amount of any asphalt or oil, as is described below. In particular, as the amount of the asphalt increases, the amount of the microcrystalline wax decreases, and, in general, as the amount of the microcrystalline wax increases, the amount of the oil increases. Generally, the microcrystalline wax may embrittle a binder that contains asphalt. Consequently, the amount of the microcrystalline wax is limited to the amount that does not make the binder too brittle to pass the standardized testing described below. However, the amount of the microcrystalline wax is sufficient to facilitate the adherence of the binder to a galvanized plate during flow testing according to ASTM D 1191 or D 3407. In one example, the amount of the microcrystalline wax is up to about 10 wt. % of the binder, and, in another example, the amount of the microcrystalline wax is between about 0.5 wt. % and about 5 wt. % of the binder. In one exemplary embodiment, the binder is between about 1.5 wt. % and about 3.0 wt. % microcrystalline wax.

As set forth above, the binder may further comprise an oil. One exemplary oil is naphthenic oil. Generally, naphthenic oils are classified as having less than about 60% paraffinic carbon and are often characterized by the ability to flow at low temperatures, unlike paraffinic oils. Naphthenic oils are available commercially, for example, from Ergon Refining, Inc. Jackson, Miss., sold under the tradename Hyprene, such as Hyprene L500, and another commercial source of oil includes Sunoco, Philadelphia, Pa. The amount of the oil that may be added to the binder may vary according to the composition of the binder, including the type and quantity of the microcrystalline wax, if any, that is added to the binder. The oil addition may restore the flexibility of the sealant composition if it is noticeably degraded due to addition of the microcrystalline wax. In one exemplary embodiment, the amount of the oil added is up to about 10 wt. % of the binder.

The sealant composition is prepared by heating the residual pitch product and optional asphalt to a temperature sufficient to reduce the viscosity thereof. During heating, the residual pitch product or the mixture may also be agitated or stirred. Temperatures of about 300° F. or more may be sufficient to lower the viscosity of the residual pitch product and asphalt depending on the compositions and quantities thereof. The elastomeric material is then added. The microcrystalline wax and/or oil may also be added to the mixture at this point.

High shear mixing may be used to blend the elastomeric material and the microcrystalline wax into the residual pitch product or into the residual pitch product and asphalt mixture. External heat may be reduced or eliminated when the elastomeric material is added if high shear mixing is used. In any case, the elastomeric material and the optional microcrystalline wax are given time to dissolve or mix into the residual pitch product or the mixture. Once the elastomeric material is mixed into the residual pitch product or the residual pitch product/asphalt mixture, the filler material is added. Additional gentle agitation may be used to thoroughly mix the filler material into the mixture. After the filler material is thoroughly mixed, the sealant composition is packaged or applied to other products.

With respect to application of the sealant composition, once the sealant composition is heated to a temperature where it easily flows, it may be applied to a surface to be waterproofed. For example, the sealant composition is heated to a temperature from above 330° F. to just below 400° F. or just below a temperature where the elastomeric material beings to degrade. Accordingly, these hot-applied or hot melt compositions are heated to reduce the viscosity of the sealant composition which facilitates pouring, brushing, or rolling the sealant composition onto the surface. Alternatively, it will be appreciated that preformed sheets of the sealant composition may be produced and subsequently unrolled or placed on the surface to be sealed. A release sheet may be used to prevent the sealant composition from adhering to itself prior to use. Accordingly, the release sheet may be removed prior to or during placement.

In addition, the sealant composition may be applied to surfaces that cannot tolerate exposure to water and may be applied at low ambient temperatures. In one embodiment, the sealant composition is substantially free of water. This characteristic allows buildings to be constructed and waterproofed in a timely manner even during periods of relatively low temperature. This characteristic is unlike aqueous-based emulsions, which require water to evaporate in order to form a water resistant coating. Furthermore, aqueous-based emulsions are composed of a mixture of water, asphalt, and a surfactant or stabilizer. Following application of these types of emulsions, the surfactant is retained in the resulting coating. The surfactant tends to render the coating far more water sensitive during subsequent exposure to rain, snow, and the like. Thus, water-based emulsion coatings may be re-emulsified by the environmental conditions. In other words, they are permeable to water and, for this reason, they are often referred to as water resistant. By contrast, sealant compositions of the present invention are nearly water proof unless punctured or applied in an incorrect manner such that coating contains gaps or through-holes. In addition, various embodiments of the present invention may not require additional preparation and airing steps, typical of emulsions.

As is known in the art, sealant compositions are tested to determine if they meet applicable industrial standards. For instance, sealant compositions are routinely tested to determine their durability at low temperature, specifically to determine whether the composition remains sufficiently flexible at low temperature. One test is set forth in ASTM D-1970. Generally, according to this test, a layer of the sealant composition is subject to a temperature of −25° F. for two hours. The sample is bent 180° in 1 to 2 seconds. The layer is examined to determine whether the layer of the sealant composition has fractured. To pass the test, the layer must not exhibit any cracking.

Another standard test is provided by Canadian Spec. CGSB-37.50-M89, titled "Hot Applied, Rubberized Asphalt for Roofing and Waterproofing." According to this test, five acetone cleaned aluminum plate measuring 75 mm by 150 mm by 0.3-0.9 mm thick are coated with about 0.118 inches (about 3 mm) of the sealant composition. Following conditioning at room temperature for 16 to 72 hours, the coated samples are held at a temperature of −13° F. for 5 hours together with about a 6 mm diameter mandrel in a cold chamber. The coated samples are each bent to 90° over the cold 6 mm diameter mandrel or dowel in about 1 to about 2 seconds while in the cold chamber with the coating on the exterior of the bend. To pass the test, the coating must not crack, however, discoloration is permissible.

In yet another common test, a layer of the sealant composition is subject to elevated temperature for a prolonged period. For example, the coated samples are subject to 158° F. for 7 days. The samples are then air cooled to room temperature before they are subject to the cold bend tests set forth above. To pass the test, the coated samples must not crack.

In addition, compositions are often tested according to the Canadian Spec. for flow when tested at about 60° C. for about 5 hours at a 75° angle. To pass this test, the composition must have a flow of at a maximum of 3 mm.

In order to facilitate a more complete understanding of the embodiments of the invention, the following non-limiting examples are provided.

Example 1

A sealant composition containing 50 wt. % binder and 50 wt. % filler material was prepared. The binder did not contain asphalt and was prepared by heating 557 g (86.3 wt. % of the binder) of SYLFAT® DP-8 residual pitch product (hereinafter "SYLFAT® DP-8") to 300° F. and mixing 55 g (8.5 wt. % of the binder) of SOLPRENE® 1205 linear random-block styrene-butadiene copolymer (hereinafter "SOLPRENE® 1205") and 33.21 g (5.1 wt. % of the binder) of SOLPRENE® 411 high molecular weight radial styrene-butadiene block copolymer (hereinafter "SOLPRENE® 411") into the hot SYLFAT® DP-8. No oil was added to the sealant composition. The softening point of the binder as measured according to ASTM D-36 using ethylene glycol. The softening point was measured as 185-185° F.

Once the binder was prepared, 100 g of HUBERCARB® G 325 calcium carbonate ($CaCO_3$) powder, was mixed with 100 g of the binder. The sealant composition was easily pourable and passed the cold bend test per Canadian Spec CGSB-37.50-M89.

Example 2

A sealant composition containing 40 wt. % binder and 60 wt. % filler material was prepared. The binder was prepared in the same manner as example 1. A mixture of 98.31 g (13.7 wt. % of the binder) of SOLPRENE® 411, 503.8 g (70 wt. % of the binder) of SYLFAT® DP-8, and 117.6 g (16.3 wt. % of the binder) of asphalt (AC-5 from Valero, San Antonio, Tex.) was prepared. The binder had a softening point of 242-243° F. To make the sealant composition, 319.4 g of the binder was mixed with 478.5 g of HUBERCARB® G 325 calcium carbonate. The sealant composition was tested and passed the cold bend test per the Canadian Spec CGSB-37.50-M89. The sealant composition was also subject to an accelerated aging test according to CGSB-37.50-M89. Accordingly, the sealant composition was heated for 5 hours. Following heating the penetration, the flow, the low temperature flexibility, and the viscosity were measured. The sealant composition passed each test according to the above-mentioned Canadian Spec.

Example 3

Following the procedure set forth in example 1, a sealant composition containing 32 wt. % binder and 68 wt. % filler material was prepared by mixing 545.6 g of the sealant composition of example 2 with 136.4 g of additional HUBERCARB® G 325 calcium carbonate. The sealant composition passed the cold bend test set forth above.

Example 4

Following the procedure set forth in example 1, a sealant composition containing 65.2 wt. % binder and 34.8 wt. % filler material was prepared. The binder contained a 75/25 ratio of residual pitch product to asphalt by weight. The binder contained 105.38 g (13.6 wt. % of the binder) of SOLPRENE® 411, 500 g (64.8 wt. % of the binder) SYLFAT® DP-8, and 166.66 g (21.6 wt. % of the binder) of AC-5 asphalt from ConocoPhillips. The binder composition had a softening point of 242-242° F. The sealant composition was prepared by taking 412.1 g of HUBERCARB® G 325 calcium carbonate and mixing it into 772.04 g of the binder. According to ASTM D-1970, a sample of the sealant composition was placed into a freezer at –25° F. After about two hours, the sealant composition was still very flexible and passed this test. The sealant composition was also subject to the cold bend testing after soaking for 5 hours at –13° F. The sealant composition also passed the cold bend test Canadian Spec CGSB-37.50-M89.

Example 5

Following the procedure set forth in example 1, a sealant composition containing 50 wt. % binder and 50 wt. % filler material was prepared. The binder contained a 40/60 ratio of residual pitch product to asphalt by weight. The binder was prepared by mixing together 110.12 g (13.7 wt. % of the binder) of SOLPRENE® 4318 linear block copolymer of styrene and butadiene (hereinafter "SOLPRENE® 4318"), 278 g (34.5 wt. % of the binder) of SYLFAT® DP-8, and 417.7 g (51.8 wt. % of the binder) of asphalt from ConocoPhillips and/or Trumbull Owens Corning Roofing and Asphalt, LLC type AC-5. No oil was added to the binder. The softening point was of the binder measured 217-217° F. To prepare the sealant composition, 324.6 g of HUBERCARB® G 325 calcium carbonate was added to 324.6 g of the binder. Samples of this sealant composition passed ASTM D-1970 testing at –25° F. The samples were also subject to the cold bend test at –13° F. per Canadian Spec CGSB-37.50-M89 and passed.

Example 6

Following a similar procedure as set forth in example 1, a sealant composition containing 50 wt. % binder and 50 wt. % filler material was prepared. The binder contained a 40/60 ratio of residual pitch product to asphalt by weight. The binder contained 90.91 g (11.0 wt. % of the binder) of SOLPRENE® 4318, 294.26 g (35.6 wt. % of the binder) of SYLFAT® DP-8, and 441.4 g (53.4 wt. % of the binder) of asphalt. The binder had a softening point of 204-204° F. To prepare the sealant composition, 366.5 g of the binder and 366.5 g of HUBERCARB® G 325 calcium carbonate were mixed together. According to ASTM D-1970, samples of this sealant composition were tested by placing a sample of it into a freezer at –25° F. for about two hours. In total, this sealant composition passed this test. Samples of this sealant composition were also prepared for cold bend testing. The samples passed the cold bend test per Canadian Spec CGSB-37.50-M89.

Example 7

Following the procedure set forth in example 1, a sealant composition containing 40 wt. % binder and 60 wt. % filler material was prepared. The binder of example 6 was used to prepare the sealant composition. To 329.7 g of that binder, 494.55 g of HUBERCARB® G 325 calcium carbonate was added. Samples of this sealant composition were placed into a freezer at –25° F. for about two hours. The samples passed this test. Samples were also prepared for cold bend testing. This sealant composition did not pass the cold bend test per Canadian Spec CGSB-37.50-M89.

Example 8

Following the procedure set forth in example 1, a sealant composition containing 50 wt. % binder and 50 wt. % filler material was prepared. The binder contained a 75/25 ratio of residual pitch product to asphalt by weight. The binder contained 64.76 wt. % SYLFAT® DP-8, 10.23 wt. % SOLPRENE® 4318, 3.41 wt. % SOLPRENE® 411 and 21.6 wt. % of asphalt having a penetration of 180 decimillimeters. The binder composition had a softening point of 196-196° F. The filler material was calcium carbonate. The sealant composition was 32.38 wt. % SYLFAT® DP-8, 5.12 wt. % SOLPRENE® 4318, 1.71 wt. % SOLPRENE® 411, and 50 wt. % HUBERCARB® G 325 calcium carbonate. The sealant composition passed ASTM D-1970 and the cold bend test per Canadian Spec CGSB-37.50-M89 and the accelerated aging test set forth above.

Example 9 (Comparative)

A comparative sealant composition was prepared. Asphalt was heated to about 300° F. Hyprene L500 oil is added to the asphalt and SOLPRENE® 4318 was added to the mix. The mixture was subject to shear mixing and heat for approximately one hour. The temperature reached about 365° F. High shear mixing was discontinued and the filler was added with continued agitation for one hour. The final composition was: 25 wt. % HUBERCARB® G 325 calcium carbonate, 4.28 wt. % Hyprene L500, and 7.72 wt. % Dynasol 4318, and 62.98 wt. % AC-5 asphalt. This mixture passes the Canadian cold bend test and ASTM testing set forth above.

However, in a similar composition, when the filler material content is increased to 30 wt. %, such that the total composition is 30 wt. % HUBERCARB® G 325 calcium carbonate, 4.00 wt. % Hyprene L500, 7.20 wt. % Dynasol 4318, and 58.80 wt. % AC-5 asphalt, the composition does not pass the Canadian cold bent test and ASTM testing set forth above.

The sealant compositions and testing results from the examples 1-8 provided above are listed in Table 1, below.

TABLE 1

Example Summary

| Sealant Composition | 1 | 2 | 3 | 4 | 5 | 6 | 7 | 8 |
|---|---|---|---|---|---|---|---|---|
| Binder to Filler Material[1] | 50/50 | 40/60 | 32/68 | 65.2/34.8 | 50/50 | 50/50 | 40/60 | 50/50 |
| Residual Pitch Product[2] to Asphalt[3] | N/A[4] | 81.1/18.9 | 81.1/18.9 | 75/25 | 40/60 | 40/60 | 40/60 | 75/25 |
| Softening Point | 185° F. and 185° F. | 242° F. and 243° F. | N/A | 242° F. and 242° F. | 217° F. and 217° F. | 204° F. and 204° F. | 204° F. and 204° F. | 196° F. and 196° F. |
| ASTM D-1970 | PASS | PASS | PASS | PASS | PASS | PASS | PASS | PASS |
| Can. Spec. CGSB-37.50-M89[7] | Partial Test | Partial Test | Partial Test | Partial Test | Partial Test | Partial Test | FAIL[8] | PASS |
| Accelerated Aging | Not Done | PASS | PASS | PASS | PASS | PASS | PASS | PASS |
| residual pitch product[2] | 86.3 | 70 | 70 | 64.8 | 34.5 | 35.6 | 35.6 | 64.8 |
| asphalt[3] | None | 16.3 | 16.3 | 21.6 | 51.8 | 53.4 | 53.4 | 21.6 |
| elastomeric material[6] | 13.6 | 13.7 | 13.7 | 13.6 | 13.7 | 11.0 | 11.0 | 13.7 |

Notes:
[1] $CaCO_3$
[2] SYLFAT® DP-8
[3] AC-5 from ConocoPhillips
[4] 100% SYLFAT® DP-8
[5] No oil added
[6] SOLPRENE® 411, SOLPRENE® 4318, and/or SOLPRENE® 1205
[7] All examples do not pass the flow test provided in Canadian Spec. CGSB-37.50-M89
[8] Fails cold bend test Example 10

A sealant composition containing 53.21 wt. % binder and 46.79 wt. % filler material was prepared. Initially, a composition similar to those prepared as described in the examples above containing 21.6 wt. % of asphalt (AC-5 from Valero, San Antonio, Tex.), 64.8 wt. % of residual pitch product (SYLFAT® DP-8), 10.2 wt. % of elastomeric material (SOLPRENE® 4318), and 3.4 wt. % of elastomeric material (SOLPRENE® 411) was prepared. The asphalt and residual pitch product were heated to about 300° F. and the elastomeric materials, set forth above, were then added. Following thorough mixing, enough filler material (HUBERCARB® G 325 calcium carbonate) was added such that the composition was 50 wt. % filler material.

To this initial composition, a microcrystalline wax and an oil were added. The initial composition was heated to melt the mixture and then 1.5 wt. % microcrystalline wax (SASOBIT® H8) was added to the initial composition. Once the microcrystalline wax was mixed into the initial composition, 5 wt. % oil (Hyprene L-500) was added. Following all additions, the sealant composition contained 53.21 wt. % binder and 46.79 wt. % filler material. The binder contained 19 wt. % asphalt, 56.9 wt. % residual pitch product, 12 wt. % elastomeric material, 2.7 wt. % microcrystalline wax, and 9.4 wt. % oil. The sealant composition passed the cold bend test per the Canadian Spec CGSB-37.50-M89, the cold bend test per ASTM D-1970, and the flow test per the Canadian Spec.

While the present invention has been illustrated by the description of embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A sealant composition comprising:
   a binder comprising:
      a residual pitch product that is a by-product of a wood pulping process; and
      an elastomeric material in an amount effective to provide non-linear elasticity to the sealant composition; and
   a filler material in an amount of between about 11 vol. % and about 67 vol. % of the sealant composition, wherein the sealant composition is substantially free of water.

2. The sealant composition of claim 1 wherein the binder further comprises a microcrystalline wax.

3. The sealant composition of claim 2 wherein the binder further comprises an oil.

4. The sealant composition of claim 1 wherein the residual pitch product comprises tall oil pitch.

5. The sealant composition of claim 1 wherein the elastomeric material comprises rubber.

6. The sealant composition of claim 1 wherein the filler material comprises calcium carbonate.

7. The sealant composition of claim 1 wherein the filler material is present in an amount of between about 25 wt. % and about 70 wt. % of the sealant composition.

8. The sealant composition of claim 1 wherein the residual pitch product is selected from the group consisting of pine pitch residue, tall oil rosin derivative, and products from tall oil fractionation.

9. The sealant composition of claim 1 wherein the elastomeric material forms the balance of the binder.

10. A sealant composition comprising:
    a binder comprising:
       a residual pitch product; and an elastomeric material; and a filler material in an amount of between about 45 and about 70 wt. % of the sealant composition, wherein the sealant composition is substantially free of water.

11. A sealant composition comprising:

a binder comprising:

from 80 up to about 96 wt. % of a residual pitch product; and an elastomeric material; and a filler material in an amount of between about 11 vol. % and about 67 vol. % of the sealant composition, wherein the sealant composition is substantially free of water.

* * * * *